TILE SIZING MACHINE AND METHOD

Original Filed March 16, 1950 4 Sheets-Sheet 1

INVENTOR.
E. S. ROBBINS

BY Ayatos Dowell
ATTORNEY

TILE SIZING MACHINE AND METHOD

Original Filed March 16, 1950 4 Sheets-Sheet 2

INVENTOR.
E. S. ROBBINS
BY
A. Yates Dowell
ATTORNEY

TILE SIZING MACHINE AND METHOD

Original Filed March 16, 1950 4 Sheets-Sheet 3

INVENTOR.
E. S. ROBBINS

BY

A. Yates Dowell
ATTORNEY

TILE SIZING MACHINE AND METHOD

Original Filed March 16, 1950 4 Sheets-Sheet 4

*INVENTOR.*
E. S. ROBBINS

*BY*

A. Yates Dowell
ATTORNEY

United States Patent Office

Re. 24,104
Reissued Dec. 27, 1955

24,104

TILE SIZING MACHINE AND METHOD

Edward Stanley Robbins, Tuscumbia, Ala., assignor to Robbins Floor Products, Inc., Tuscumbia, Ala.

Original No. 2,691,254, dated October 12, 1954, Serial No. 150,067, March 16, 1950. Application for reissue August 23, 1955, Serial No. 530,222

20 Claims. (Cl. 51—89)

Figure 1:
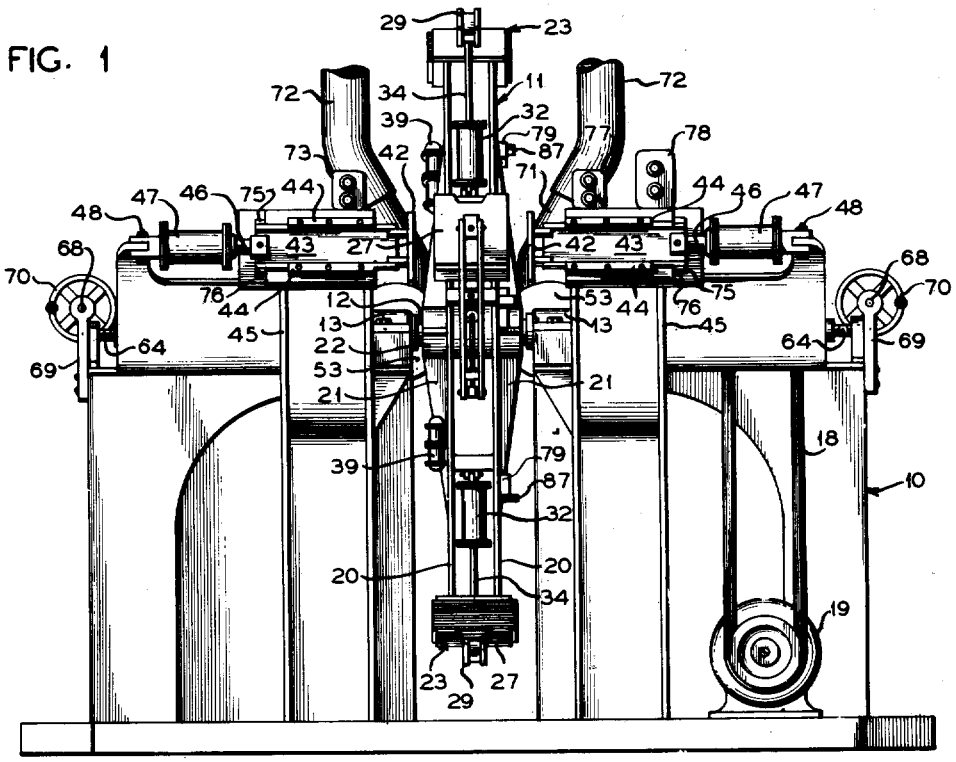

Matter enclosed in heavy brackets [ ] appears in the original patent but forms no part of this reissue specification; matter printed in italics indicates the additions made by reissue.

This invention relates to manufacturing and more particularly to a machine or apparatus and process for accurately squaring and sizing tile such as those formed of rubber, asphalt, wood, or other composition.

Tile of the above nature are customarily laid on a floor or other surface and secured thereto by means of an adhesive applied to the surface, the adjacent edges of the tile abutting each other without the presence of adhesive or other filler therebetween. Consequently, it is extremely important that the tile be accurately sized and also that the sides be exactly at right angles to each other in the case of square tile or that the angles between the sides be all equal in the case of tile of other configuration.

Such tile are normally manufactured by cutting the same from a large sheet or web of material, the cutting operation being accomplished by a gang die or by a knife, this cutting of the tile representing the final finishing operation and consequently the accuracy of the operation determines the accuracy of the tile. Tile produced in this way, even when extreme caution is used, exhibited a very great variation in dimensions of from .01 to .02 of an inch. Such a variation was sufficient to cause unsightly cracks or spaces in the tile covered surface which are, of course, extremely undesirable in view of the fact that these spaces became filled with dirt or other foreign matter and also this resulted in an undesirable covering from the standpoint of appearance.

A variation in dimensions of the magnitude referred to above also resulted in tile which were not necessarily square or which possessed variations in the angles between the sides and consequently the labor and care involved in laying the tile on a surface was materially increased since it was often necessary to try numerous tile in a given place before one which adequately fitted could be found. Such a cut and try or selection method was obviously very time consuming and materially contributed to the cost of installation and consequently any apparatus or process which would result in the economical production of tile maintaining a size tolerance of as little as plus or minus .001 of an inch and at the same time provide perfectly square tile or tile in which the angles between the sides were equal would be an extremely valuable contribution to the art resulting in a material reduction in the cost of installation and providing a more pleasing and effective covering.

It is, accordingly, an object of this invention to provide a tile sizing machine in which a large number of tile in the form of a stack may be placed in the machine and accurately sized and squared, the operation with the exception of inserting and removing the stack being entirely automatic.

It is a further object of this invention to provide a tile sizing machine in which a stack of tile may be accurately sized whereby the variation in dimensions will not exceed a tolerance of plus or minus .001 of an inch.

It is a further object of the invention to provide a tile sizing machine in which a stack of tile may be accurately sized whereby the variation in dimensions will not exceed a tolerance of plus or minus .001 of an inch and whereby the angles between the sides of the resulting tile are equal.

It is a further object of the invention to provide a tile sizing machine which is sufficiently efficient to economically produce accurately sized and squared tile and in which the entire operation may be conducted and controlled by a single operator.

It is a further object of the invention to provide a process for accurately sizing and squaring surface covering tile.

Figure 2:
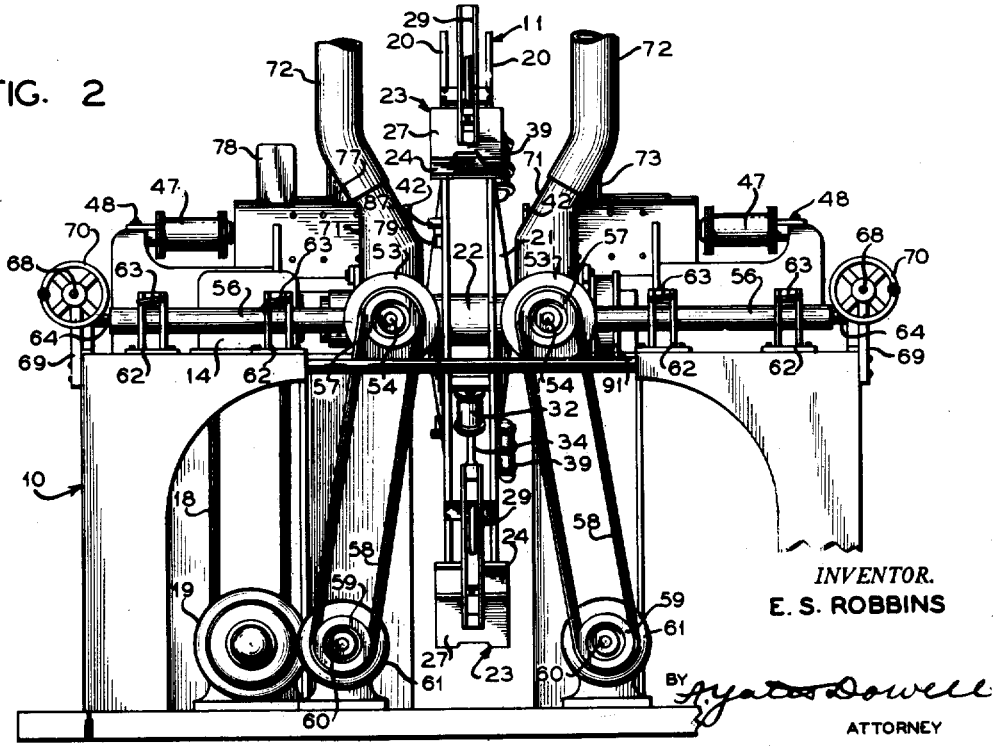
Figure 3:
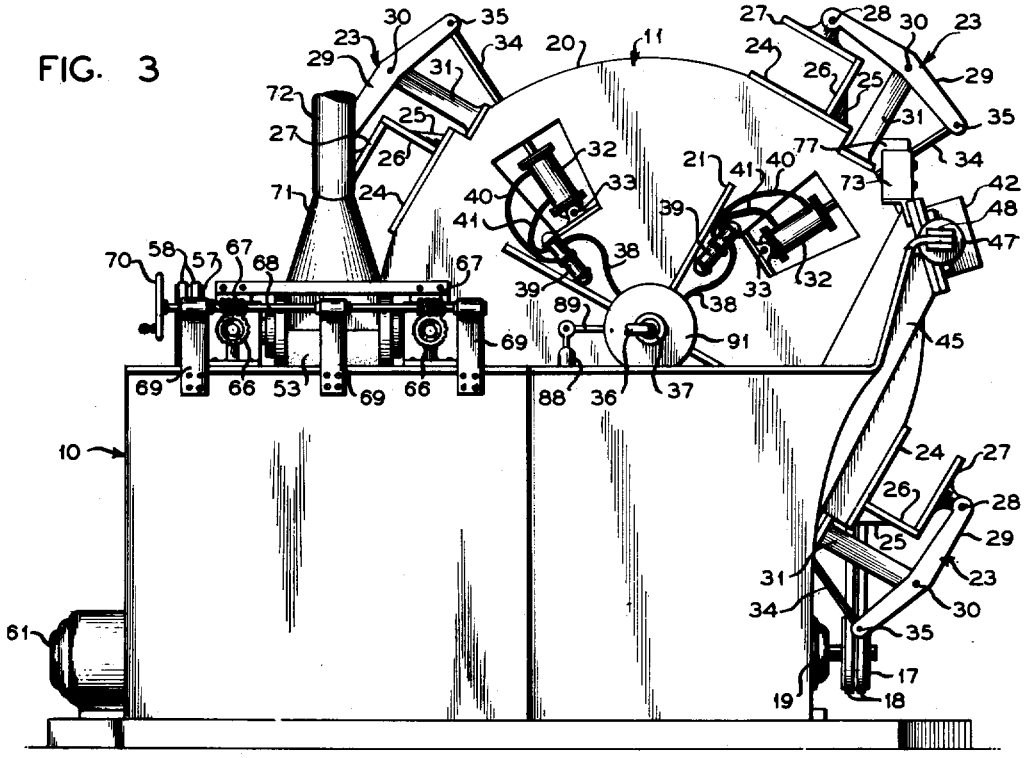
Figure 5:
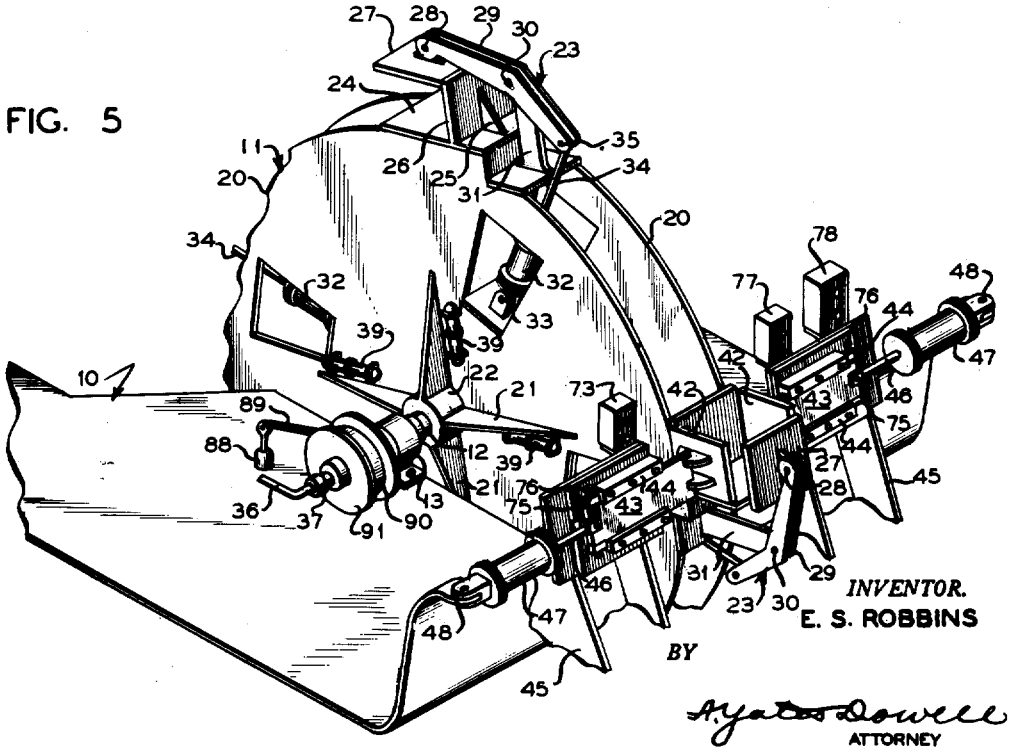
Figure 4:
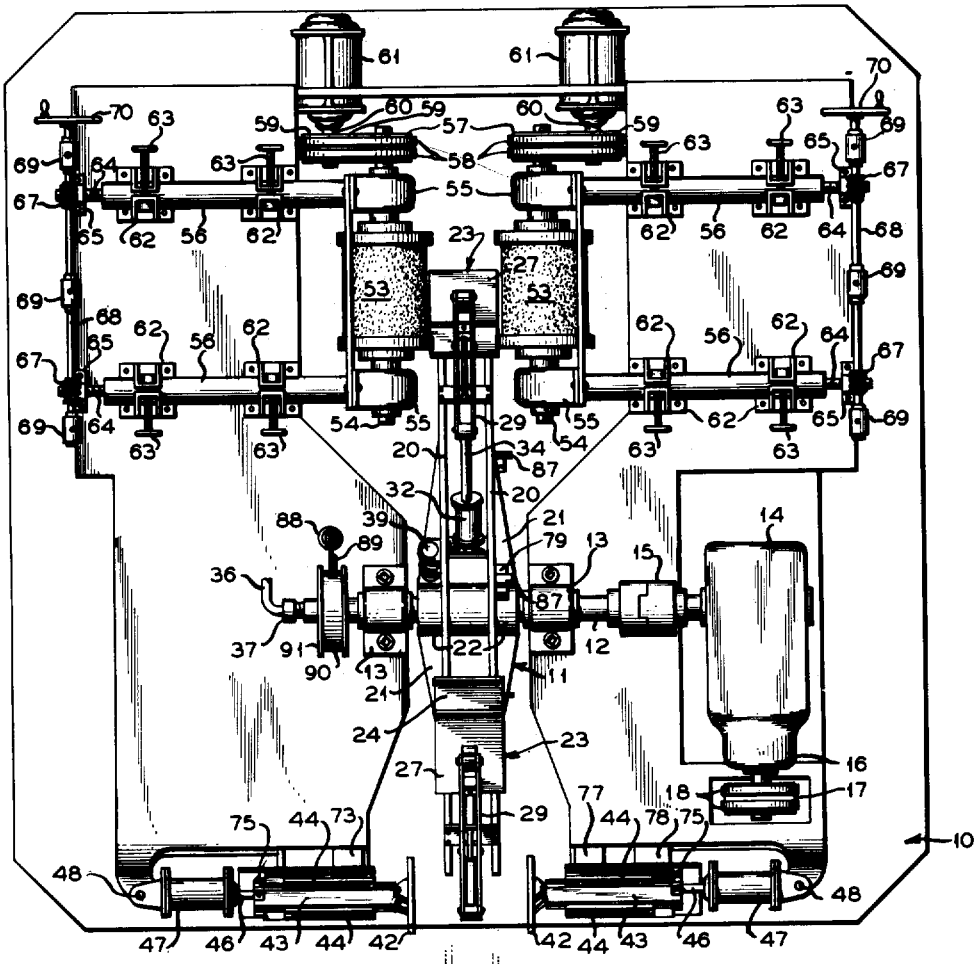
Figure 6:
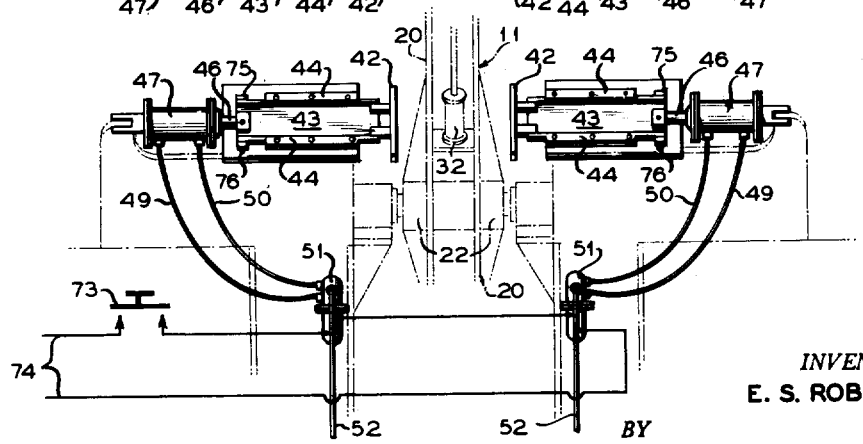
Figure 7:
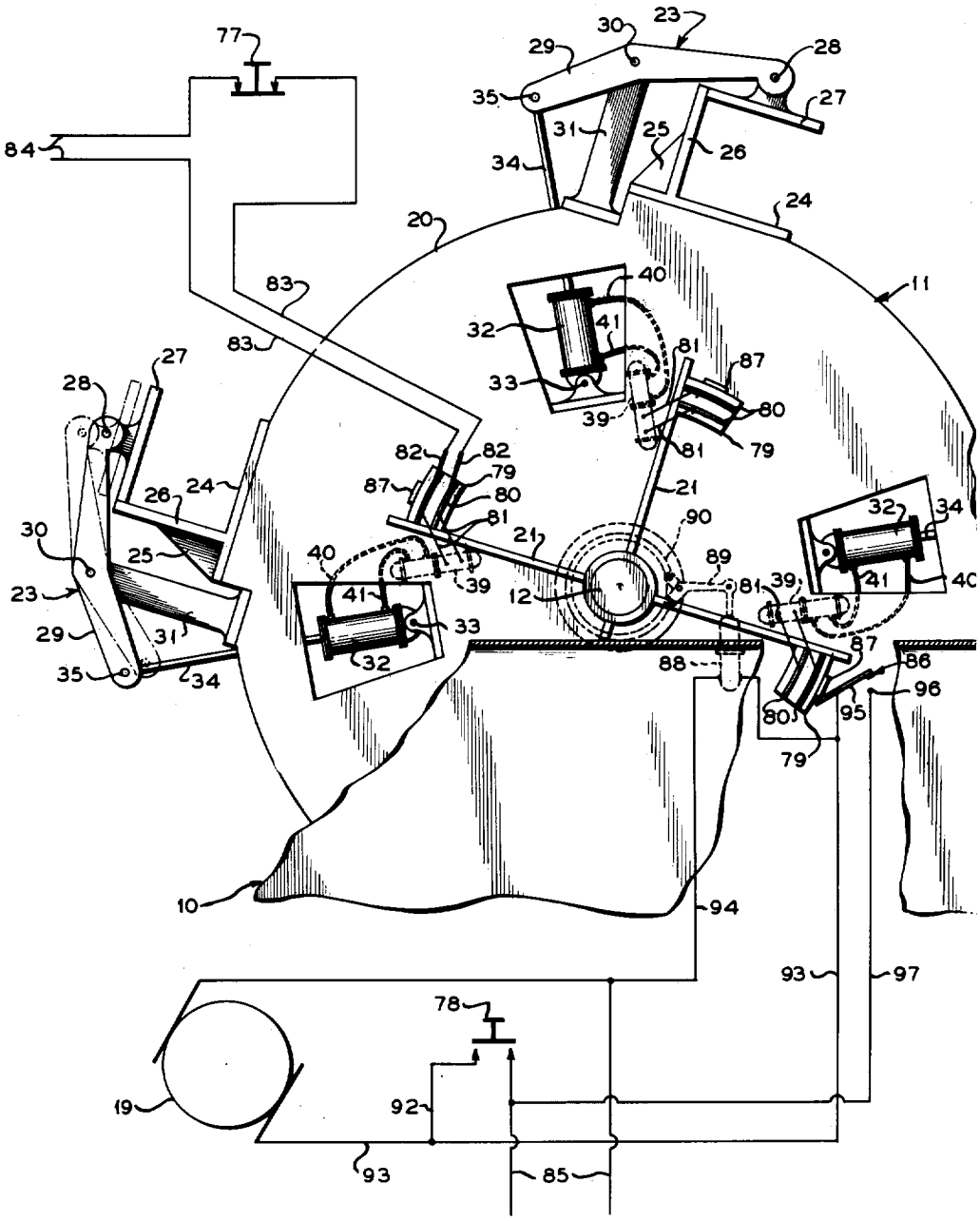

Further objects and advantages of the invention will be apparent from the following description taken in conjunction with the accompanying drawings, wherein:

Fig. 1 is an elevational view of the tile sizing machine of this invention showing the operator's side of the machine;

Fig. 2, a rear elevational view of the machine;

Fig. 3, a side elevational view showing the turret utilized for carrying the stacks of tile and the clamping mechanism for retaining the tile therein;

Fig. 4, a top plan view of the machine;

Fig. 5, a fragmentary perspective view showing the apparatus for accurately positioning the stacks of tile on the turret;

Fig. 6, a fragmentary elevational view showing the mechanism for positioning the stack of tile on the turret and the control means therefor; and, Fig. 7, a fragmentary view of parts of the machine and showing in detail the control circuits for controlling the operation of the tile stack clamping means and the control means for rotating the turret and for locking the same in position when it is at rest.

With continued reference to the drawings, the tile sizing machine of this invention comprises a base or frame 10 which is cut away along the longitudinal center line to accommodate a turret 11 which is in the nature of a relatively large wheel, the turret being mounted upon a shaft 12 which is journalled in bearings 13 mounted on the frame 10. The shaft 12 is connected to a speed reducing gear box 14 through a coupling 15, power being supplied to the gear box 14 through a shaft 16 carrying pulleys 17 which are engaged by belts 18 driven from a motor 19 mounted on the base 10.

The turret 11, as shown in the drawings, comprises two parallel spaced generally circular plates 20 each of which may be provided with radial webs 21 terminating in hubs 22 which serve to securely mount the plates upon the shaft 12. Positioned at equal angular distances around the periphery of the turret 11 are a plurality of work clamping means 23 each of these clamping means comprising a platen 24 secured to the turret and providing a base for receiving and supporting a stack of tile to be sized.

Secured to the turret 11 by an angle bracket or the like 25 is an upstanding plate 26 which serves to locate and support one edge of the stack of tile and the stack is securely clamped in position on the platen 24 by a movable pressure plate 27. Pressure plate 27 is pivotally secured by a pin or the like 28 to a rocker arm 29 which is pivotally mounted at 30 on a stand 31 secured to the turret 11.

The rocker arm 29 is operated by a pneumatic or hydraulic cylinder 32 pivotally secured at 33 to the turret 11, the cylinder 32 slidably receiving a piston attached to a connecting rod 34 which in turn is pivotally secured at 35 to the end of rocker arm 29.

Fluid pressure for actuating the connecting rod 34 and clamp 23 is provided through a conduit 36 connected through a rotary joint 37 with the end of shaft 12, which is hollow for at least a portion of its length. Connected to the shaft 12 and communicating with the interior thereof are a plurality of branch conduits 38 leading to solenoid operated valves 39 which control the operation of cylinder 32 and connecting rod 34. The valves 39 are connected to the cylinder 32 through conduits 40 and 41.

In order to accurately position stacks of tile in the clamping mechanism 23 there is provided an apparatus best shown in Figs. 5 and 6 which includes a pair of aligning or positioning plates 42 located at each side of the turret 11. Plates 42 are mounted on slides 43 which are slidably secured by guides 44 to a bracket 45 mounted on the base 10. Plates 42 are reciprocated toward and away from each other by connecting rods 46 which are attached to pistons disposed in fluid pressure cylinders 47 secured at 48 to the base 10 of the machine. Cylinders 47 are supplied with fluid pressure through conduits 49 and 50 which are connected to solenoid operated valves 51 from which supply conduits 52 lead to a source of fluid pressure.

The mechanism for accurately sizing and squaring the stack of tile carried by the clamping mechanism 23 on the turret 11 comprises a pair of grinding drums 53 mounted on shafts 54 which extend radially of the turret 11 and are journalled in bearings 55 mounted on spaced parallel rods 56. Shafts 54 carry pulleys 57 which are engaged by belts 58 driven by pulleys 59 mounted on shafts 60 of drive motors 61.

In order to provide for varying the distance between grinding drums 53 the rods 56 are slidably mounted in brackets 62 secured to the base 10. These brackets are split and are provided with clamping screws 63 which may be conveniently manipulated to securely clamp the rods 56 in adjusted position. In order to provide for sliding movement of the rods 56 they are internally threaded to receive threaded shafts 64 which are rotatably mounted in bearings 65 secured to the base 10. The shafts 64 are provided adjacent the outer ends thereof with worm wheels 66 which are engaged by worms 67 mounted on adjusting shafts 68. Shafts 68 are journalled in brackets 69 secured to the base 10 and are provided with hand wheels 70 which may be conveniently operated to rotate the threaded shafts 64 and thus move the rods 56 and attached grinding drums 53 toward or from each other.

The threaded shafts 64 may be of sufficiently small pitch to provide for extremely accurate adjustment of the grinding drums 53, adjustments of less than .001 of an inch being entirely practical.

If desired, in order to dispose of dust, grit, and other foreign matter resulting from the grinding operation, there may be provided hoods 71 positioned adjacent each grinding drum 53, which hoods are connected with conduits 72 which conduits in turn may be connected to a vacuum air filter system.

The grinding drums 53 may operate continuously during the operation of the machine but the turret is intermittently rotated and the positioning plates 42 are periodically reciprocated and the control mechanism for controlling these operations will now be described.

With particular reference to Fig. 6, the solenoid valves 51 which control operation of the connecting rods 46 and aligning plates 42 are controlled by a switch 73 which is normally open and with the switch in this condition and the solenoid valves 51 deenergized fluid pressure will be supplied to cylinders 47 through conduits 50 thereby retracting the aligning plates 42 away from stack engaging position. Closing of switch 73 energizes valves 51 from a power source 74 and introduces fluid pressure to the cylinder 47 through conduits 49. This operation moves the aligning plates 42 toward each other and the extent of this movement is controlled by limit stops or blocks 75 secured to slides 43 in such a position as to abut the guides 44 thus preventing further inward movement of the plates 42. Blocks 75 are secured in place on slides 43 by screw threaded fastening means or the like 76 and various sizes of blocks 75 may be provided in order to accommodate tile of different dimensions.

The means for controlling the operation of clamps 23 and the rotation of turret 11 comprises a normally closed switch 77 and a normally open switch 78 and the associated circuits. Secured to one side of one of the plates 20 forming the turret 11 and disposed concentrically with the axis thereof are a plurality of contact elements 79 one of these elements being provided for each of the clamp operating cylinders 32. Each of the elements 79 is provided with two electrically isolated conductor bars 80 which are connected by conductors 81 with the adjacent solenoid valve 39. Contact brushes 82 are connected by suitable conductors 83 with switch 77 and a source of current 84.

The turret driving motor 19 receives its power from a source of electrical energy 85 which is controlled by switch 78 and an automatically operated switch 86 pivotally mounted in the path of movement of an arm 87 secured to the turret 11 adjacent each contact element 79. The control circuit for the turret drive motor 19 also includes a solenoid 88 which through an actuating linkage 89 serves to apply or release a brake band 90 disposed about a brake drum 91 fixed to the turret mounting shaft 12. Brake band 90 serves to lock the turret 11 in position while stacks of tile are being placed thereon or being removed therefrom and is released during rotation of the turret 11.

The operation of the turret drive control circuit is as follows: assuming the turret 11 to be at rest the operator closes switch 78 which applies energy through conductor 92 to conductor 93 which is connected to the motor 19. Conductor 93 is also connected to solenoid 88 and closing of the switch 78 will therefore energize this solenoid to release the brake band 90 thus permitting rotation of the turret 11 in response to operation of the motor 19. The return circuit from solenoid 88 and motor 19 is through conductor 94 to the power source 85. Automatic switch 86 is provided with a pivoted contact arm 95 connected to conductor 93 and a stationary contact 96 is connected through conductor 97 to power source 85 and one contact of switch 78. With the turret at rest and in the position shown in Fig. 7 the automatic switch 86 is open and the path of flow of electrical energy to the motor 19 and solenoid 88 will be as described above. However immediately after rotation of the turret 11 commences the arm 87 will move out of engagement with the pivoted contact arm 95 allowing switch 86 to close thus completing the circuit between conductor 93 and conductor 97. Switch 78 may now be opened and the drive motor 19 will continue to operate and the solenoid 88 will continue to be energized holding brake band 90 out of engagement with brake drum 91, the turret continuing to rotate until the next arm 87 contacts the pivoted contact arm 95 to move the same out of engagement with stationary contact 96 thus opening the circuit and deenergizing drive motor 19 and solenoid 88. Deenergization of this solenoid applies the brake band 90 to the brake drum 91 and locks the turret 11 against further rotation. The cycle may then be repeated by depressing or closing the switch 78.

The operation of the control circuit for the clamp mechanism 23 is as follows: solenoid valve 39 when deenergized operates to introduce fluid pressure to cylinder 32 through conduit 41 which moves the connecting rod 34 outwardly and the pressure plate 27 into engagement with a stack of tile supported on the platen 24. Thus the pressure plate 27 will be in clamping position at all positions of the turret 11 except when the clamp is located at the loading station shown at the left in Fig. 7. The contact bars 80 of contact element 79 will engage with brushes 82 and therefore the solenoid valve 39 is energized by the flow of electrical energy from a source of current 84 through normally closed switch 77 and conductors 83 and 81. This results in the introduction of fluid pressure to cylinder 32 through conduit 40 to move the pressure plate 27 outwardly thus releasing the stack of tile clamped thereby. The pressure plate 27 is moved inwardly to clamp a new stack of tile by depressing switch 77 to open the circuit thus deenergizing the solenoid 39 resulting in outward movement of connecting rod 24 to move the pressure plate 27 inwardly toward platen 24. Switch 77 is retained in open position until turret 11 has rotated sufficiently to move contact bars 80 out of contact with brushes 82 at which time switch 77 may be allowed to close thus conditioning the circuit for automatically opening the next succeeding clamp upon engagement of the associated contact bars 80 with the brushes 82.

The operation of the tile sizing machine is believed to be obvious from the above description but briefly the complete operation thereof is as follows: with the turret 11 at rest and in the position shown in Figs. 5 and 7 a stack of tile which may number 36 or any other desired number is placed on the upstanding plate 26 and the switch 73 is closed to energize solenoid valves 51 this resulting in movement of the aligning plates 42 toward each other to engage and align the edges of the stack of tile. The blocks 75 are so proportioned that either of the plates 42 will move sufficiently to locate the adjacent edges of the stack of tile inwardly toward the center line between the grinding drums such that these edges will engage the appropriate grinding drums when moved thereby. Since the cylinders 47 are provided with fluid pressure from the same source the pressure exerted by each cylinder will be the same and consequently if one clamping plate 42 for some reason moves faster than the other movement of this plate will be stopped by engagement of the block 75 with the guide 44 and thereafter the opposing plate 42 will continue to move until the pressure exerted by the two plates is equalized.

Upon completion of the movement of aligning plates 42 toward each other the switch 77 is actuated to open the circuit to solenoid valve 39 thus deenergizing the same and causing the clamp mechanism 23 to operate thereby securely clamping the stack of tile in position. Upon completion of the clamping operation the switch 73 may be opened to deenergize solenoid valves 51 thus returning aligning plates 42 to their original position.

The switch 78 is now closed to energize the turret drive motor 19 and deenergizes solenoid 88 thereby releasing brake band 90, the motor 19 causing turret 11 to rotate in a clockwise direction as viewed in Fig. 7. Rotation of the turret 11 causes the closing of automatic switch 86 and thereafter switch 78 may be released or opened, rotation of the turret 11 continuing until the next clamp 23 moves into loading position whereupon automatic switch 86 will be opened deenergizing the motor 19 and solenoid 88 and applying the brake band 90 to lock the turret in position. At the same time brushes 82 will engage contact bars 80 to energize solenoid valve 39 and release clamp 23 whereupon a stack of finished [files] *tile* thereon may be removed.

During rotation of the turret 11 a stack of tile previously placed in one of the clamps will be carried between the grinding drums 53 which will engage the opposite side edges thereof and remove a sufficient amount of material to accurately align these edges. Since the space between the grinding drums 53 may be very accurately adjusted the resulting dimensions of the stack of tile will be within a tolerance of plus or minus .001".

Upon completion of the sizing of one side of the stack of the tile, when this stack arrives at the loading station [L] and the clamp is released the stack is removed and turned 90° to position the unfinished edges laterally of the machine whereupon the operation above described is repeated and the final finishing operation on the stack of tile is carried out.

It will be seen from the above that there has been provided by this invention a tile sizing machine which with the exception of placing a stack of tile thereon and removing the same therefrom is automatical in operation and which results in producing finished tile at a very rapid rate, which tile are very accurately dimensioned both as to size and the angular relationship between the sides. There has likewise been provided control circuits which are completely fool-proof and which automatically perform their functions once the cycle of operation has been initiated. Sufficient adjustments have also been provided in the machine to actuate various sizes of tile and the change from one size to another may be accomplished by merely substituting appropriate size blocks 76 and adjusting the distance between the grinding drums 53 by operation of the hand wheels 70.

It will be obvious to those skilled in the art that various changes may be made in the invention without departing from the spirit and scope thereof and therefore this invention is not limited by that which is shown in the drawings or by that which has been described in the specification but only as indicated in the appended claims.

What is claimed is:

1. A tile sizing machine comprising in combination a base, a turret rotatably mounted on said base, a drive motor supported on said base and drivingly connected to said turret for rotating said turret, a motor control circuit connected to said drive motor, a plurality of work clamps carried by said turret for clamping stacks of tile thereon and movable past a loading station where tile may be inserted and removed from said work clamps, brake means supported by said base for locking said turret against rotation with one of said work clamps positioned at said loading station, stack aligning means adjacent said loading station comprising aligning plates positioned on opposite sides of the path of movement of said clamps and movable toward and away from each other, fluid pressure means supported on said base and connected to said aligning plates for moving said aligning plates toward each other whereby the opposite edges of a stack of tile disposed in the work clamp positioned at said loading station may be aligned, opposed grinding drums slidably mounted on said base one on each side of said turret, means supported on said base for adjusting the distance between said grinding drums whereby upon rotation of said turret stacks of tile carried by said work clamp will pass between said grinding drums to size and square said tile and means operatively connected to said turret, work clamps, and aligning plates for controlling the rotation of said turret, the operation of said work clamps, and the operation of said aligning plates.

2. A machine as defined in claim 1 in which said brake means is operated by a solenoid connected in the turret drive motor control circuit, said circuit including a normally open manually operable switch the closing of which releases said brake and initiates rotation of said turret and an automatic switch connected across said manual switch and operable to short circuit the same after rotation of said turret commences whereby said manual switch may be released and rotation of said turret will continue and means on said turret operable upon each clamp reaching said loading station to open said automatic switch thereby deenergizing the turret drive motor and applying said brake to stop rotation of said turret.

3. A machine as defined in claim 1 in which said brake means is operated by means connected in the turret drive motor control circuit, said circuit including a normally open manually operable switch the closing of which releases said brake and initiates rotation of said turret and an automatic switch operable after rotation of said turret commences whereby said manual switch may be released and rotation of said turret will continue and means on said turret operable upon each clamp reaching said loading station to open said automatic switch thereby opening said drive motor control circuit and applying said brake to stop rotation of said turret.

4. A machine as defined in claim 1 in which said work clamps are operated by fluid pressure, a solenoid valve for controlling the operation of each work clamp, said valve operating to apply said clamp when said solenoid is deenergized, a plurality of pairs of contacts mounted on said turret each pair being connected to one of said solenoid valves, a pair of brushes positioned to successively engage each pair of contacts as the associated clamp reaches said loading station, a power source including a normally closed switch connected to said brushes whereby upon reaching said loading station said solenoid valve will be energized to release said clamp and upon opening of said switch said solenoid valve will be deenergized to apply said clamp.

5. A machine as defined in claim 1 in which said work clamps are operated by fluid pressure, a solenoid valve for controlling the operation of each work clamp, a plurality of pairs of contacts mounted on said turret each pair being connected to one of said solenoid valves, a pair of brushes positioned to successively engage each pair of contacts as the associated clamp reaches said loading station, a power source including switch means connected to said brushes whereby upon reaching said loading station said solenoid valve may be operated to release said clamp to permit removal of the finished stack of tile and upon positioning of an unfinished stack of tile therein said switch may be actuated to apply said clamp.

6. A machine as defined in claim 1 in which said work clamps are operated by fluid pressure, a solenoid valve for controlling the operation of each work clamp, contacts mounted on said turret for movement therewith, said contacts being connected to said solenoid valves, stationary contacts supported on said base for successively engaging said movable contacts as each work clamp reaches said loading station, a power source including switch means connected to said stationary contacts whereby upon reaching said loading station said solenoid valve may be operated to release said clamp to permit removal of a finished stack of tile therefrom and upon placing of an unfinished stack of tile in said clamp said switch means may be actuated to apply said clamp.

7. A machine as defined in claim 1 in which stop means for limiting movement of said aligning plates toward each other comprises blocks removably secured to the aligning plate moving mechanism, said blocks engaging a fixed portion of said machine for limiting movement of said aligning plates whereby said blocks may be removed and replaced by different sized blocks to accommodate said machine to tile of different dimensions.

8. A tile sizing machine comprising in combination a base, a turret rotatably mounted on said base, a drive motor mounted on said base for rotating said turret, a plurality of work clamps carried by said turret for clamping stacks of tile thereon, said clamps passing through a loading station, means supported on said base and connected to said turret for locking said turret against rotation with one of said work clamps positioned at said loading station, stack aligning means adjacent said loading station comprising aligning plates movable toward and away from each other, stop means in the path of said aligning means for limiting movement of said aligning plates toward each other whereby the opposite edges of a stack of tile disposed in the work clamp positioned at said loading station may be aligned, opposed grinding drums slidably mounted on said base, one on each side of said turret, means adjustably connecting said drums to said base for adjusting the distance between said grinding drums whereby upon rotation of said turret stacks of tile carried by said work clamps will pass between said grinding drums to size and square said tile and control means connected to said motor, turret, work clamps and aligning means for controlling the rotation of said turret, the operation of said work clamps, and the operation of said aligning plates.

9. A tile sizing machine comprising in combination a base, a turret rotatably mounted on said base, a drive motor mounted on said base for rotating said turret, a plurality of work clamps carried by said turret for clamping stacks of tile thereon, said clamps passing through a loading station, means supported on said base and connectible to said turret for locking said turret against rotation with one of said work clamps positioned at said loading station, stack aligning means adjacent said loading station comprising aligning plates movable toward and away from each other whereby the opposite edges of a stack of tile disposed in the work clamps positioned at said loading station may be aligned, opposed grinding drums slidably mounted on said base one on each side of said turret, means adjustably connecting said drums to said base for adjusting the distance between said grinding drums whereby upon rotation of said turret stacks of tile carried by said work clamp will pass between said grinding drums to size and square said tile and control means connected to said motor, turret, work clamps and aligning means for controlling the rotation of said turret, the operation of said work clamps and the operation of said aligning plates.

10. A tile sizing machine comprising in combination a base, a turret rotatably mounted on said base, a drive motor supported on said base for rotating said turret, a plurality of work clamps carried by said turret for clamping stacks of tile thereon, said clamps passing through a loading station upon rotation of said turret, stack aligning means adjacent said loading station whereby the opposite edges of the stack of tile disposed in the work clamp positioned at said loading station may be aligned, opposed grinding drums slidably mounted on said base one on each side of said turret, means adjustably connecting said drums for adjusting the distance between said grinding drums whereby upon rotation of said turret stacks of tile carried by said work clamps will pass between said grinding drums to size said tile and control means connected to said turret, work clamps and aligning means for controlling the rotation of said turret, the operation of said work clamps and the operation of said aligning means.

11. A tile sizing machine comprising in combination a base, a turret rotatably mounted on said base, a drive motor supported on said base for rotating said turret, a plurality of work clamps carried by said turret for clamping stacks of tile thereon, said clamp passing through a loading station upon rotation of said turret, stack aligning means adjacent said loading station whereby the opposite edges of a stack of tile disposed in the work clamp positioned at said loading station may be aligned, opposed grinding means means mounted on said base one on each side of said turret, means connecting said grinding means for adjusting the distance between said grinding means whereby upon rotation of said turret stacks of tile carried by said work clamps will pass between said grinding means to size said tile and [means] control means connected to said turret, work clamps, and aligning means for controlling the rotation of said turret, the operation of said work clamps and the operation of said aligning means.

12. A tile sizing machine comprising a base, a tile carrying turret mounted for rotation about a horizontal axis, an upstanding plate extending substantially radially from the periphery of said turret, a platen extending transversely of said plate, a movable pressure plate mounted on said turret and movable toward and from said platen for clamping tile between said platen and said pressure plate, aligning means positioned on opposite sides of said turret and mounted on said base for engaging the opposite free edges of tile held by said platen and pressure plate for properly centering the tile therebetween, means on the turret to move the pressure plate toward and from the platen, tile sizing means mounted on opposite sides of said turret for engaging and removing excess material from the said opposite free edges of said tile, and means reacting between the base and the turret for moving said turret relative to said aligning means and said sizing means whereby tile are accurately sized on their opposite edges, said machine being operable to size all of the edges of said tile.

13. A method of sizing tile comprising positioning the edges of a stack of tile on a generally horizontal supporting surface of less width than said edge of said tile with the tile surfaces in upstanding position, aligning opposite lateral edges of the stack of tile while said stack is supported on said generally horizontal surface by the movement of yieldable means engaging said lateral opposite edges by a predetermined limited movement, clamping said stack of tile by pressure on the exposed faces of the outer tile to prevent displacement thereof and passing the stack of clamped tile between laterally disposed sizing means for simultaneously sizing said opposite lateral edges of said stack of tiles.

14. A method of sizing tile comprising positioning the edges of a stack of tile on a generally horizontal supporting surface of less width than said edge of said tile with the tile surfaces in upstanding position, aligning opposite lateral edges of the stack of tile while said stack is supported on said generally horizontal surface by the movement of yieldable means engaging said lateral opposite edges by a predetermined limited movement, clamping said stack of tile by pressure on the exposed faces of the outer tile to prevent displacement thereof and passing the stack of clamped tile between laterally disposed sizing means for simultaneously sizing said opposite lateral edges of said stack of tile, unclamping said tile and positioning one of said lateral edges of said stack on said horizontal surface and yieldably engaging the first mentioned edge of said tile and an edge opposite thereto by a limited movement of yieldable aligning means, clamping said stack of tile and passing said stack of tile between sizing means engaging said first mentioned edge and the edge opposite thereto, and removing said tile.

15. Method of sizing tile comprising placing a stack of tile [on edge] on a generally horizontal supporting surface, applying yieldable means against [the] lateral opposite edges of the tile of a predetermined limited amount while the tile is supported on said generally horizontal surface to align the opposite lateral edges of the tile, applying pressure against the exposed faces of the outer tile of the stack to clamp and prevent displacement of the tile and moving the stack of clamped tile between laterally disposed sizing means to simultaneously size opposite lateral edges of the tile.

*16. A method of sizing tile comprising placing a plurality of tile in a stack against a flat surface, applying yieldable power pressure means against a pair of lateral edges of the tile while the stack of tile is in contact with said flat surface thereby to align the edges of the tile, applying pressure against the exposed faces of the outer tile to clampingly hold the stack and to prevent displacement of the tile therein, and moving such held stack in a curved path between spaced sizing means to simultaneously trim the edges of the stack of tile.*

*17. A method of sizing tile comprising placing a plurality of tile in a stack on a flat surface, applying yieldable power pressure against lateral edges of the stack of tile while the stack of tile is in contact with said flat surface thereby to align the edges of the tile, applying pressure against the exposed faces of the outer tile to clampingly hold the stack and to prevent displacement of the tile therein, and moving such held stack in a curved path between spaced trimming means to simultaneously trim the lateral edges of the tile, indexing the tile, and moving the same in a curved path between the spaced trimming means to simultaneously trim intermediate edges of the tile.*

*18. The method of sizing tile comprising positioning a plurality of tile in a stack on a support, applying work aligning members having flat work contacting portions by means of a yieldable power pressure means over an appreciable area to a pair of lateral edges of said stack of tile while the tile are sufficiently free for relative movement to align the tile, clamping the tile in aligned condition by applying pressure against the exposed faces of the outer tile, trimming by rotary means the aligned lateral edges of the tile, and thereafter trimming other lateral edges of the tile to accurately trim the tile in all transverse directions.*

*19. Apparatus for sizing tile comprising a support on which a plurality of tile may be positioned, means for pivotally mounting said support, work aligning members having flat work contacting portions lying in planes at right angles to the axis of pivoting of said support in operative relation to the same for engaging lateral edges of said tile, power pressure means to yieldingly urge the flat work contacting portion of at least one of said members against the corresponding lateral edges of said tile to align the same, power pressure clamping means mounted on said support for engaging the exposed faces of the outer tile for maintaining the tile in aligned position, opposed power driven trimming means, and means for moving the tile support relative to the opposed power driven trimming means so that the opposed edges of the tile will be accurately trimmed to size.*

*20. Apparatus for sizing tile comprising a support on which a plurality of tile may be positioned, work aligning members having flat work contacting portions for engaging lateral edges of said tile while the tile is positioned on said support, power pressure means to urge the flat work contacting portion of at least one of said members against the corresponding lateral edges of said tile to align the same, power pressure clamping means for engaging the exposed faces of the outer tile for maintaining the tile in aligned position, opposed power driven trimming means, radially extending support means for said clamping means and mounted for rotative movement relative to said trimming means about an axis parallel to the planes of the exposed faces of the tile, and means for moving the clamping means with the tile relative to and between the opposed power driven trimming means so that the opposed edges of the tile will be accurately trimmed to size.*

References Cited in the file of this patent or the original patent

UNITED STATES PATENTS

| | | |
|---|---|---|
| 675,940 | Erickson | June 11, 1901 |
| 691,267 | Hill | Jan. 14, 1902 |
| 752,482 | Thompson | Feb. 16, 1904 |
| 961,560 | Trautvetter | June 14, 1910 |
| 1,454,399 | Norris | May 8, 1923 |
| 1,556,995 | Johnson | Oct. 13, 1925 |
| 1,862,704 | Prouty | June 14, 1932 |
| 1,863,303 | Goad | June 14, 1932 |
| 1,881,954 | Payzant | Oct. 11, 1932 |
| 1,924,594 | Blood | Aug. 29, 1933 |
| 1,926,577 | Behle | Sept. 12, 1933 |
| 1,933,640 | Schafer | Nov. 7, 1933 |
| 1,965,620 | Young | July 3, 1934 |
| 1,990,002 | Schafer | Feb. 5, 1935 |
| 1,992,452 | Troendey | Feb. 26, 1935 |
| 2,145,310 | Lewis | Jan. 31, 1939 |
| 2,383,638 | Faber | Aug. 28, 1945 |

FOREIGN PATENTS

| | | |
|---|---|---|
| 41,737 | Switzerland | Dec. 1, 1907 |